Feb. 2, 1971 H. F. ERDLEY 3,559,492
TWO-AXES ANGULAR RATE AND LINEAR ACCELERATION MULTISENSOR
Filed Jan. 30, 1967 5 Sheets-Sheet 1
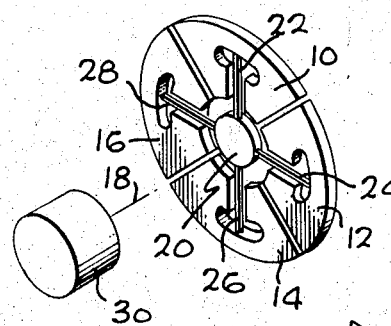
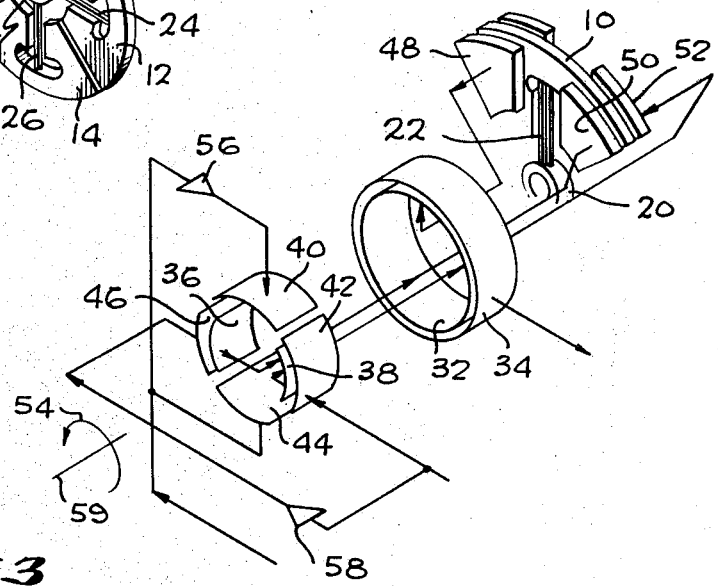
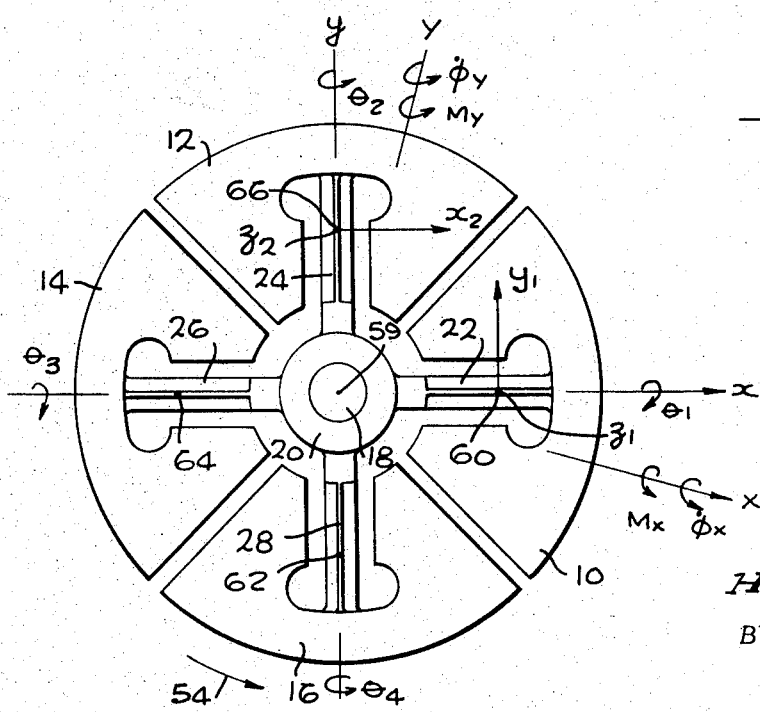
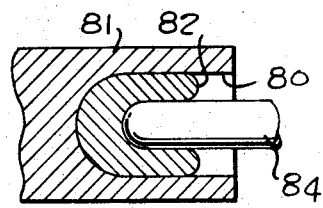
INVENTOR.
HAROLD F. ERDLEY
BY
Ernest L. Brown
ATTORNEY

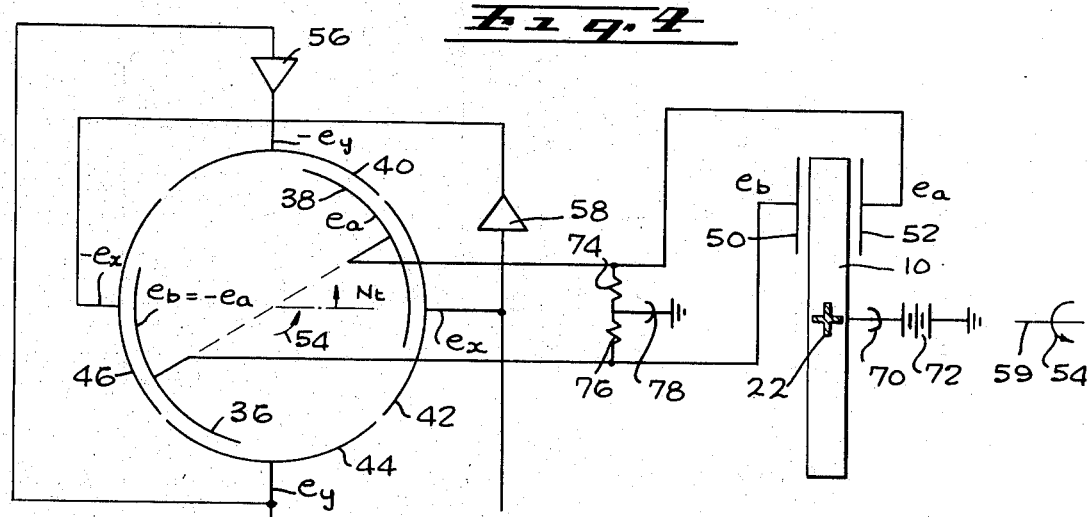
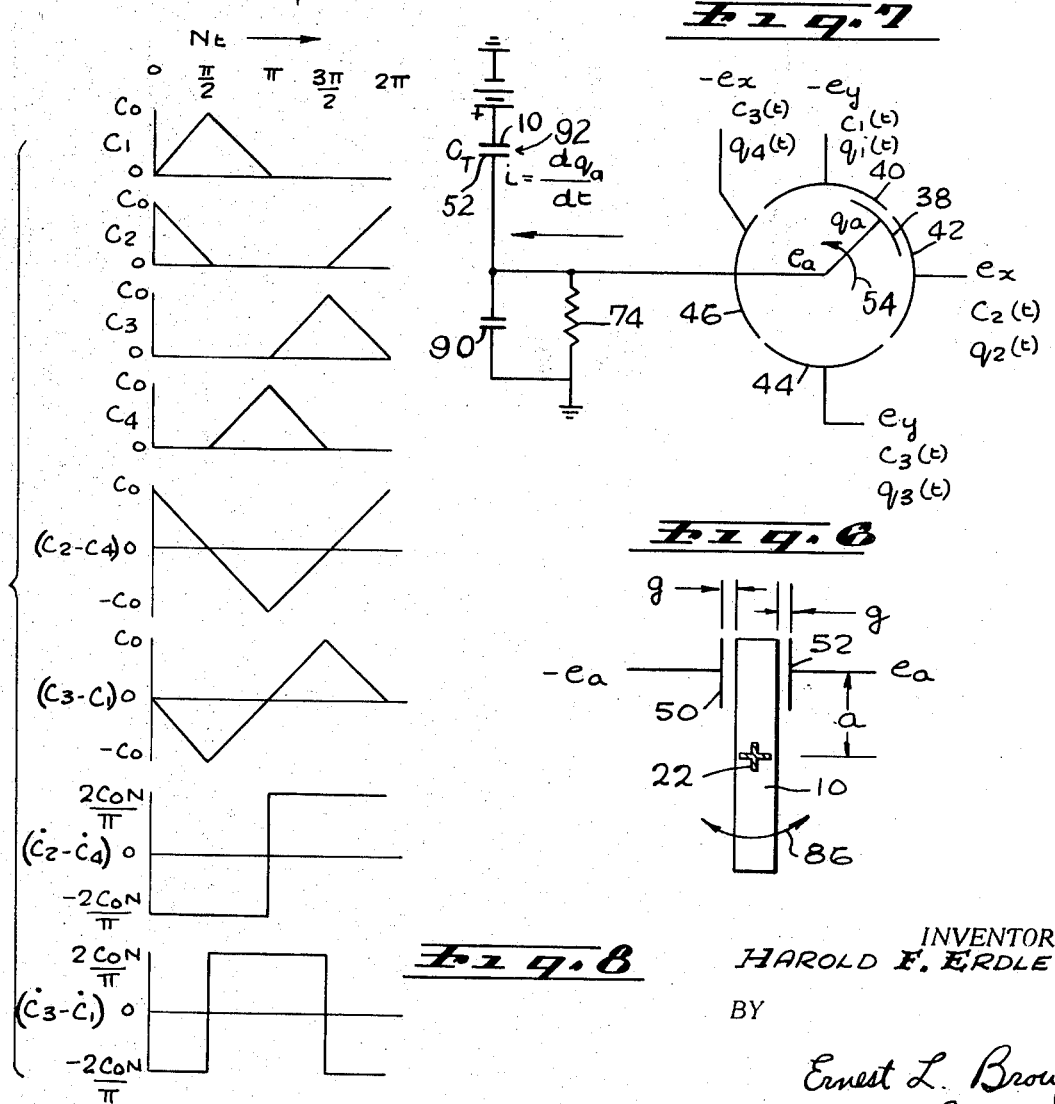

Feb. 2, 1971  H. F. ERDLEY  3,559,492
TWO-AXES ANGULAR RATE AND LINEAR ACCELERATION MULTISENSOR
Filed Jan. 30, 1967
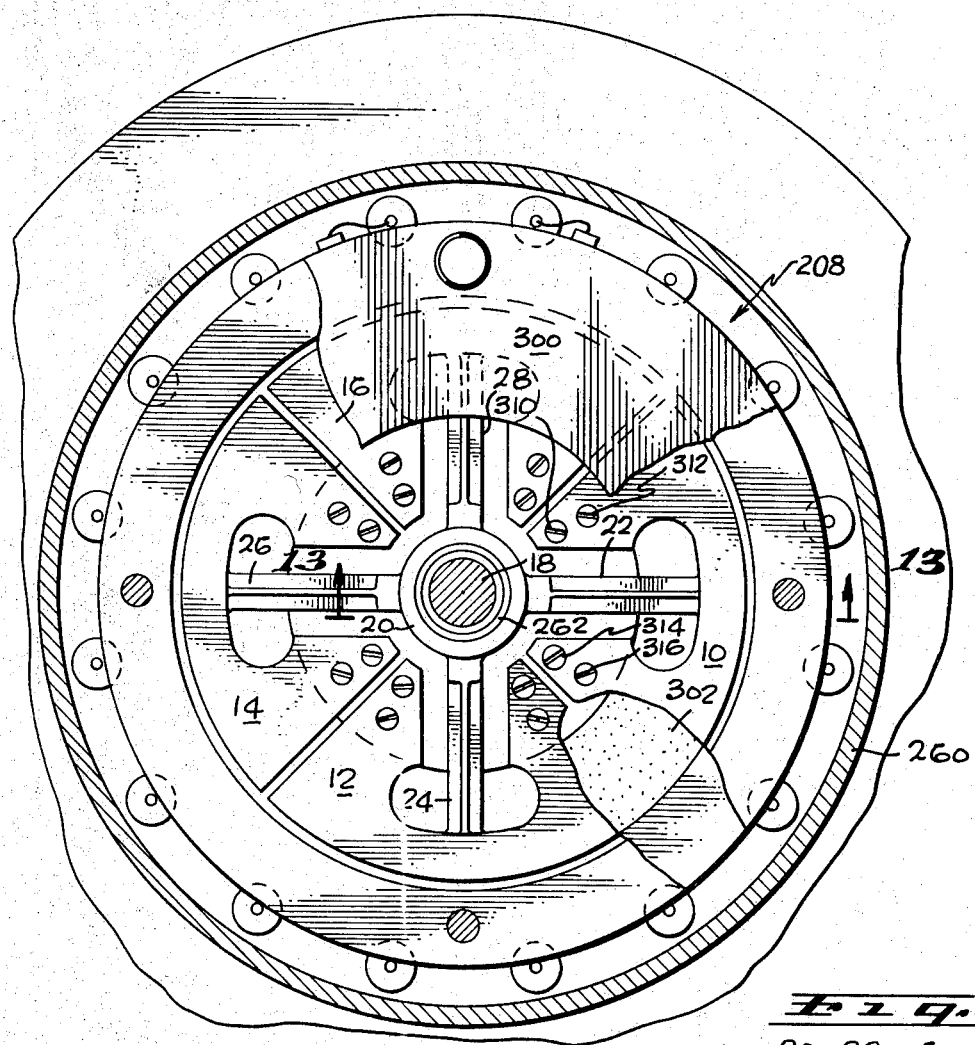
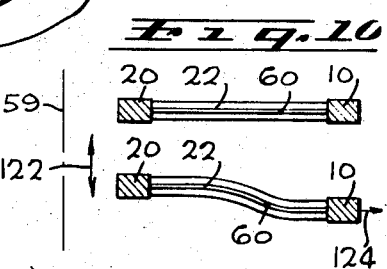
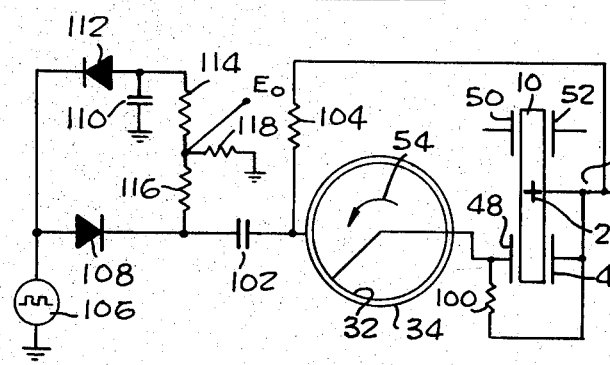
INVENTOR.
HAROLD F. ERDLEY
BY
Ernest L. Brown
ATTORNEY

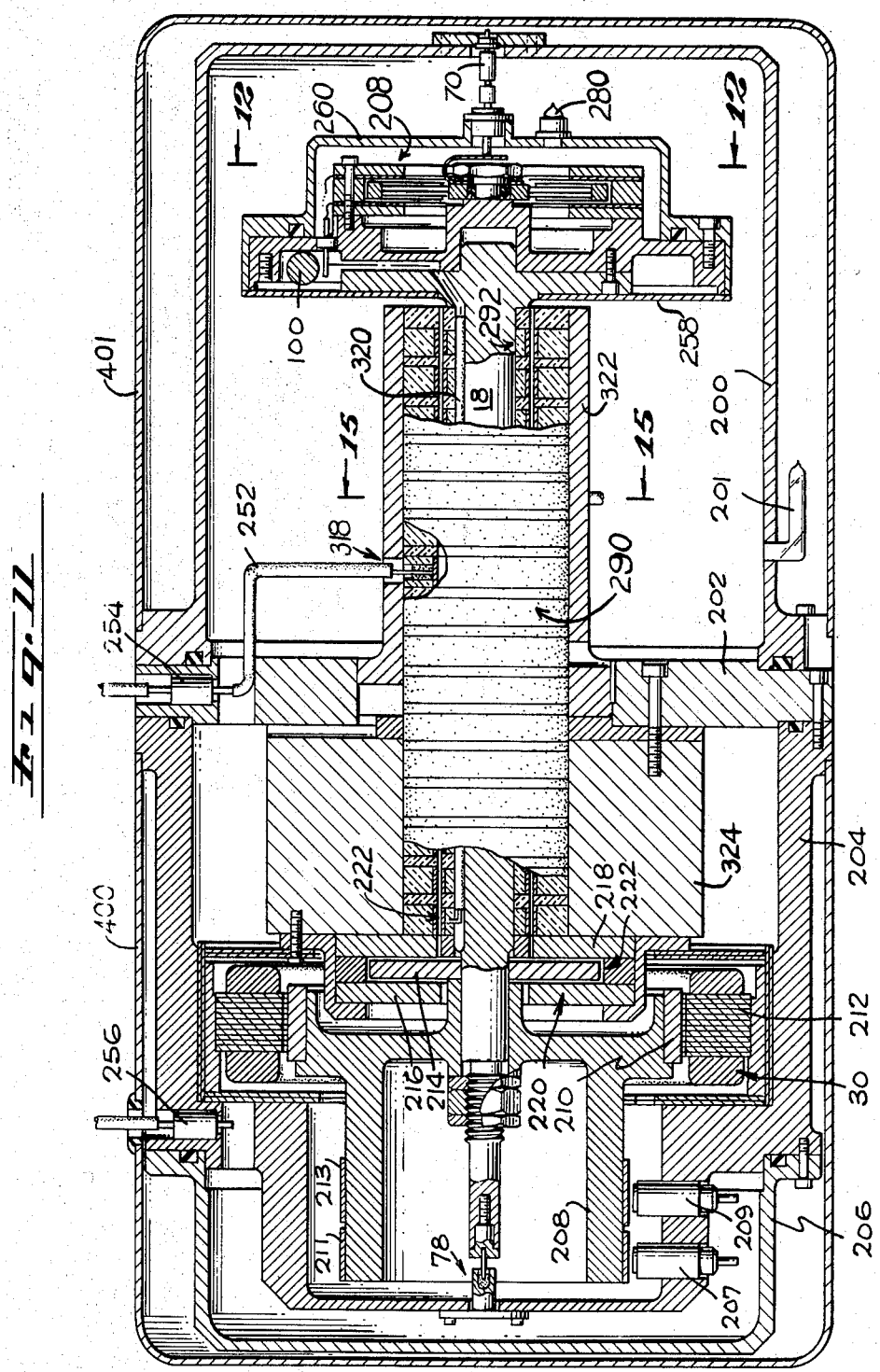

Feb. 2, 1971  H. F. ERDLEY  3,559,492
TWO-AXES ANGULAR RATE AND LINEAR ACCELERATION MULTISENSOR
Filed Jan. 30, 1967
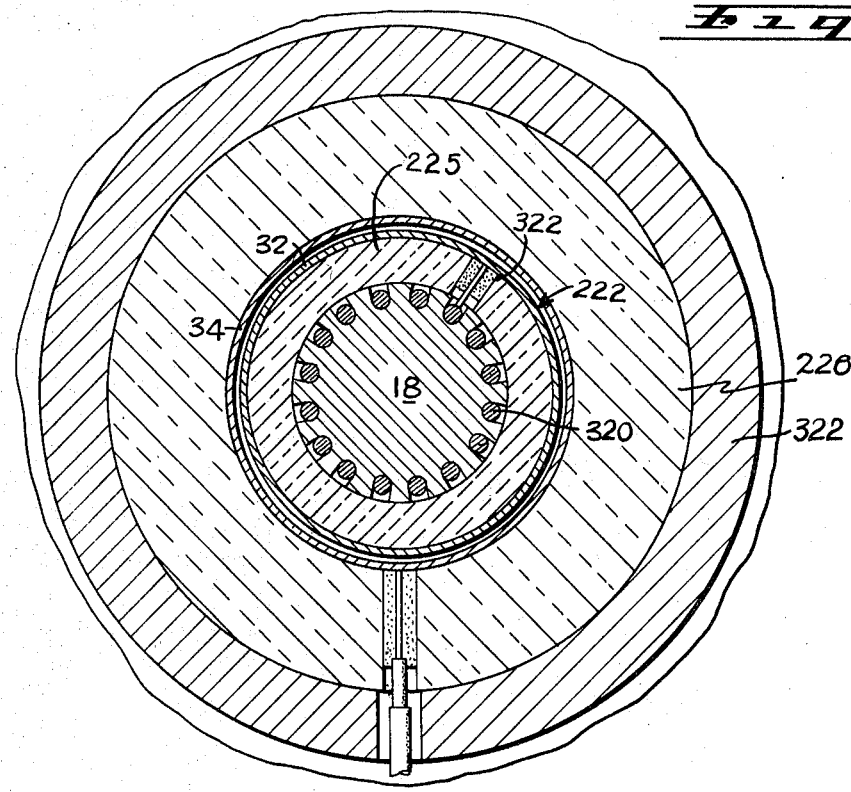
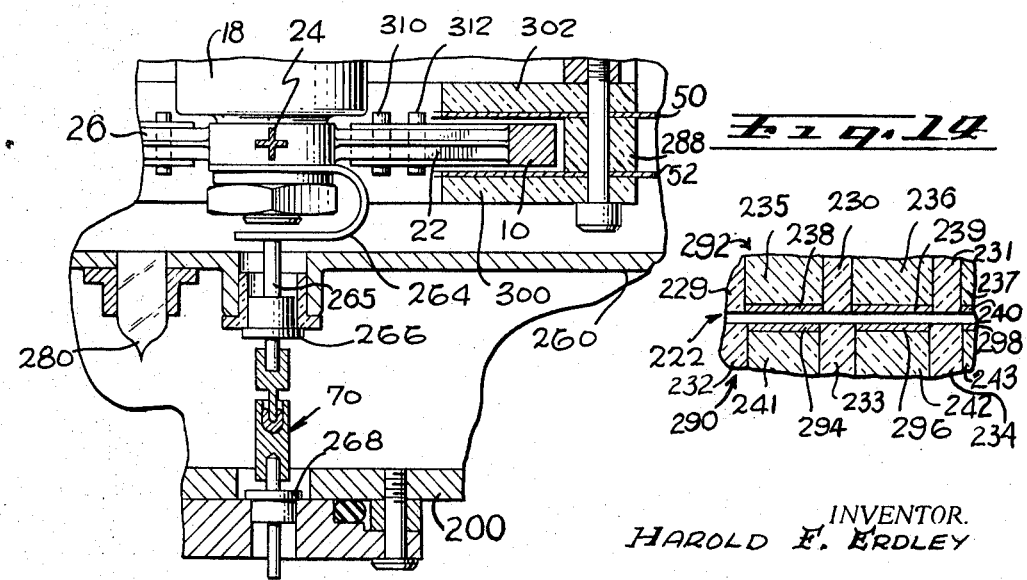
INVENTOR.
HAROLD F. ERDLEY
BY
Ernest L. Brown
ATTORNEY United States Patent Office 3,559,492
Patented Feb. 2, 1971

3,559,492
TWO-AXES ANGULAR RATE AND LINEAR ACCELERATION MULTISENSOR
Harold F. Erdley, Pacific Palisades, Calif., assignor to Litton Systems, Inc., Beverly Hills, Calif., a corporation of Maryland
Filed Jan. 30, 1967, Ser. No. 612,401
Int. Cl. G01p 15/02
U.S. Cl. 73—505                                                                 19 Claims

ABSTRACT OF THE DISCLOSURE

A vibratory member, supported by a torsion spring means whose axis of twist is perpendicular to the axis of spin of a supporting shaft, the undamped natural angular frequency of vibration of the vibratory member upon its supporting spring means being set equal to the angular frequency of rotation of the supporting shaft. The vibratory member is adapted to be set into vibration by acceleration or rotation of the instrument.

---

The present invention relates to navigation instruments, and in particular to an improved vibrating rotor gyroscope and accelerometer multisensor.

More particularly the device of this invention is an improvement of the type of vibrating rotor instrument described in co-pending United States patent applications entitled "Vibra-Rotor Gyroscope" by H. F. Erdley et al., Ser. No. 323,985 filed Nov. 15, 1963, now Pat. No. 3,463,- 016; "Vibra-Rotor Gyroscope" by H. F. Erdley et al., Ser. No. 386,596, filed July 31, 1964, now Pat. No. 3,318,- 160 and "Vibrating Rotor Gyroscope" by H. F. Erdley, Ser. No. 457,740, filed May 21, 1965, now Pat. No. 3,382,- 726, each assigned to the same assignee as the present patent application.

SHORT DESCRIPTION OF THE INVENTION

In general, a vibrating rotor gyroscope comprises at least one vibrating inertial element mounted on a rotating shaft. The inertial element rotates with the shaft and is torsionally restrained with vibrational freedom about its mounting axis which is angularly disposed (ordinarily perpendicular) to the rotating shaft. The vibrating rotor gyroscope is designed so that the undamped natural angular frequency of vibration of the inertial element about its mounting axis is equal to the angular frequency of rotation of the rotating shaft (designated "N") in order to make the inertial element very sensitive to motions at right angles to the axis of the shaft. An external angular displacement or rotation of the vibrating rotor gyroscope about any axis, except the spin axis of the shaft, causes such intertial element to vibrate relative to the rotating shaft, about its mounting axis, at the spin frequency.

If the time constant of the instrument were very short, the amplitude of the response would be proportional to the angular velocity applied to the case of the instrument. However, by making the time constant very long, the amplitude builds up slowly and, by operating the instrument in the linear portion of the exponential envelope, the amplitude is proportional to the angular rates times the time during which the angular rate is applied, i.e. is proportional to the angular displacempent of the outer case or housing. The phase of the vibration, relative to a reference or timing signal, is a direct measure of the direction of the axis of the angular displacement relative to the case of the instrument. Hence, a vibrating rotor gyroscope may be used in place of a direct reading, two-degree-of-freedom gyroscope.

Since the vibrating rotor gyroscope requires no complicated gimbal suspension system or flotation fluid, it has an extremely low drift rate and is far superior to conventional gyroscopes. Due to the fact, however, that the sensitivity of the inertial element to external forces is at the angular frequency of shaft rotation, any spurious forces or vibrations which act, in the equation of motion of the vibrating rotor gyroscope, as driving forces of an angular frequency equal to the angular frequency of shaft rotation cause an output error signal to appear which is indistinguishable from the output signal which is caused by an external driving angular displacement. It has been found that such spurious output signals can be generated in some of the prior art devices by an inherent shaft wobble, of angular frequency 2N due to the asymmetry in the bearing mechanisms supporting the rotating shaft.

In the present invention, in a preferred embodiment thereof, the shaft wobble has been decreased by the use of extremely quiet bearings such as air bearings, gas bearings, or the like.

The present invention has succeeded in further reducing the above mentioned disadvantages of the prior art devices by using a plurality of inertial elements mounted on a single shaft in such a manner that the output signals therefrom may be combined to eliminate the errors in the output signals which are caused by vibrational forces of angular frequency 2N.

Further, since the device of this invention uses a plurality of inertial elements on a single shaft, by making the inertial elements on a single shaft, by making the inertial elements pendulous in a particular fashion, both rotational and accelerational information can be obtained from the some instrument.

More particularly, the device of this invention uses a plurality (usually four) of substantially coplanar inertial sensing elements, each supported by a separate torsion spring— such as a flexure pivot or torsion bar. The torsion bars are equally spaced circumferentially around the common rotating shaft. In a preferred embodiment which has four coplanar elements, the elements are each confined within a quadrant of a circle. Each of the torsion bars is attached to the common shaft at substantially coplanar points in a predetermined plane perpendicular to the axis of the common shaft by a uniformly compliant structure, preferably having a stiffness at least an order of magnitude greater than that of each torsion bar.

In one preferred embodiment of the invention, the cross-section of each torsion bar is a cruciform. In one embodiment of the invention, adapted to sense angular displacements only, the centers of gravity of the four sensing elements are, in the absence of a component of acceleration parallel to the axis of the common shaft, positioned substantially coplanar in the above-mentioned plane of attachment of the torsion bars. The radial and circumferential position of the center of gravity of each of the inertial sensing elements is preferably equal to the radial and circumferential position of the point of inflection of its supporting torsion bar, said point of inflection being determined under conditions of spinning of the shaft at its angular frequency N, and being determined in a bending mode caused by acceleration components parallel to the spin axis of the supporting shaft. It should be noted that the point of inflection of the torsion bar is radially displaced during rotation of the shaft from its ally displaced during rotation of the shaft from its position under static conditions because of the radially directed centripetal force carried by the torsion bar. With the center of gravity of the sensing element positioned as described, the sensing element is not angularly displaced by acceleration components parallel to the spin axis of the supporting shaft. That is, no angular momentum is transferred to the sensing element in response to said acceleration.

In a second embodiment of the invention, the center of gravity of each of the sensing members is slightly displaced, in directions parallel to the spin axis of the supporting shaft, from the above-mentioned plane of attachment of the torsion bars. Preferably the centers of gravity of the two sensing elements of each pair of diametrically opposed sensing elements are displaced in opopsite directions from the above-mentioned plane. Thus, each of the sensing elements is preferably designed to have a specific and equal value of unbalance or pendulosity, with the polarity or sense of the unbalance opposite for sensing members which are in diametrically opposed positions. Such an embodiment of the invention, in which the members are pendulous, is sensitive not only to angular displacements about axes perpendicular to the axis of rotation of the supporting shaft, but also to acelerations perpendicular to the spin axis of the supporting shaft.

The device of this invention, although sensitive to angular displacements of the instrument about axes perpendicular to the spin axis of the shaft, and sensitive to accelerations perpendicular to the spin axis of the shaft, are insensitive to angular displacements at angular rates which are twice the angular spin rate of the shaft and to linear vibratory acceleration occurring at angular frequencies which are equal to twice the angular spin rate of the shaft.

Although it is possible, in accordance with this invention, to use only two inertial sensing elements, with their supporting torsion bars at right angles to each other, to obtain the measure of angular displacement and linear acceleration, the lower level of symmetry produces an increased sensitivity to angular rates and accelerations which are twice the angular spin frequency of the shaft and complicates the packaging and balancing of the instrument. The only increase in space and volume required for four sensing elements, compared with one or two sensing elements, is that volume due to the additional torque applying members and pickoffs.

The torque-applying members and pickoffs in the shown embodiment are capacitor plates which rotate with the supporting shaft and are in proximity to the vibrating inertial elements. They sense the oscillation of the inertial elements and apply torque of the proper phase, to the inertial elements, about the torsion axes of the supporting torsion bars. Other pickoff and torque-applying devices—for example, electromagnetic devices—may be used.

One of the advantages of the use of tuned oscillatory inertial elements is that the residual errors are not related to the size or angular momentum of the inertial elements, but rather to spin bearing imperfections, the shape of the inertial elements, and the quality of the torque applying members and pickoffs. It is therefore, possible to fabricate a significantly smaller instrument, with a given degree of precision, than for instruments using conventional gyroscopes and accelerometer concepts or principles.

One of the sources of noise, which includes noise at twice the angular spin rate, is the spin bearings, particularly where ball bearings are used. In one preferred embodiment of the invention, therefore, gas spin bearings are used to reduce the noise.

With gas spin bearings, both pickoff and torque applying signals may be carried to the spinning shaft and inertial elements across the capacitance between the rotor and stator. Alternatively, rotating transformers may be used to carry pickoff and torquing signals between the rotor and stator. In still another embodiment, commutators and slip rings may be used. Various techniques such as time-separation and frequency separation may be used to prevent cross-talk between the pickoff and torque-applying signals.

In an alternate embodiment of the invention, it is contemplated to apply pulse torques to the sensing elements by using precision electrical voltage pulses of fixed magnitude and of a time duration which is one half of the period of the shaft rotation.

In general, a plurality of electrical circuits must be carried across the air bearing. An air bearing using stacked elements in which the bearing surfaces of the elements are alternately dielectric spacers and conductive electrodes along the length of the bearing is used in one of the preferred embodiments of the invention.

It is therefore a primary object of this invention to sense angular rates and displacements.

It is also a primary object of this invention to sense acceleration.

It is, therefore, an object of this invention to provide a new and improved instrument using vibrating inertial elements to sense angular rates and displacements and to sense acceleration.

It is also an object of this invention to provide a vibrating element multisensor.

It is likewise an object of this invention to provide such a vibrating element multisensor in which the vibrating inertial elements are supported substantially in a plane perpendicular to the supporting rotating shaft.

It is a more particular object of this invention to provide a vibrating inertial element multisensor having four inertial elements each cantilevered from a supporting shaft upon a separate torsion bar, with said torsion bars being attached to said shaft in a substantially coplanar arrangement and extending from said shaft at substantially right angles to each other.

It is a more specific object of this invention to provide a device as in the next above recited object in which the center of gravity of each said inertial element is radially and circumferentially substantially coincident with the point of inflection of its supporting torsion bar, said point of inflection being determined under conditions of rotation of said rotor at its predetermined angular rate of rotation with applied acceleration parallel to the axis of rotation of said shaft.

It is yet another object of this invention to provide a multisensor in which the individual inertial elements are each circumferentially confined within a quadrant of a circle.

It is still another object of this invention to provide four substantially coplanar inertial elements in a vibrating rotor multisensor in which the centers of gravity of each of the sensors is slightly displaced from the axis of its supporting torsion spring, in a direction parallel to the axis of rotation of the supporting shaft, to give each of said sensors a predetermined pendulosity to sense accelerations perpendicular to said axis of rotation of the supporting shaft.

It is still another object of this invention to provide an improved vibrating rotor multisensor having four mechanically decoupled inertial elements supported by four cantilevered torsion springs; said springs being attached to a rotatable shaft at substantially coplanar positions which are substantially ninety degrees apart about the axis of rotation of said supporting shaft, and which extend radially therefrom at substantially right angles to each other; each of said springs supporting at its radially outer extremity one of said inertial elements, each said element and spring combination being mechanically tuned, for oscillation about the longitudinal axis of its said torsion spring, to the predetermined frequency of the rotation or spin of said shaft; and the center of gravity of each said element being radially and circumferentially positioned to coincide with the radial and circumferential position of the point of inflection of said torsion spring under angular rotation at said predetermined spin frequency and under conditions of acceleration parallel to the axis of said shaft.

It is a more explicit object of the invention to achieve the next above recited object and further to displace the center of gravity of each of said inertial elements in a direction parallel to the axis of rotation of the supporting shaft to make each of said inertial elements sensitive to acceleration perpendicular to the axis of rotation of said shaft.

It is an even more explicit object of this invention to displace the centers of gravity of two of said diametrically opposed inertial elements in opposite directions.

It is a more general object of the present invention to provide a vibrating rotor multisensor capable of providing both rotational and accelerational information.

It is still another general object of the present invention to provide a vibrating rotor gyroscope having a plurality of independently mounted inertial elements.

It is a further general object of the present invention to provide a vibrating rotor gyroscope having a plurality of mounted inertial elements whose suspension means are angularly disposed from one another.

It is another general object of the present invention to provide a vibrating rotor gyroscope having a plurality of inertial elements, at least one of which has its center of mass displaced a preselected distance from its point of suspension.

Other objects will become apparent from the following description, taken in connection with the accompanying drawing in which:

FIG. 1 is a diagram of a typical rotor showing four inertial elements;

FIG. 2 is a schematic diagram showing a capacitive torquer and pickoff capacitive means for carrying torquing signals to the torquer and pickoff signals from the pickoff device;

FIG. 3 is a plan view of the rotor of FIG. 1, more particularly showing a coordinate system;

FIG. 4 is a schematic diagram of a torquing circuit;

FIG. 5 is a view, partly in section, of a mercury cup contactor which may be used with the device of this invention;

FIG. 6 is a diagram which is useful in explaining the electrostatic spring rate of the electrostatic torquer;

FIG. 7 is a schematic diagram of a typical capacitive commutator which may be used to carry torquing signals across a gas-bearing gap;

FIG. 8 is a graph of capacitance and capacitance rates, useful in explaining FIG. 7;

FIG. 9 is a schematic diagram showing a typical pickoff circuit;

FIG. 10 is a view, partly in section, showing the deflection of a torsion spring and inertial element under acceleration loads which are parallel to the spin axis of the supporting shaft;

FIG. 11 is a view, partly in section, of a typical mechanism which is fabricated in accordance with this invention;

FIG. 12 is a view, partly in section, taken at 12—12 in FIG. 11;

FIG. 13 is a fragmented view, partly in section, taken at 13—13 in FIG. 12;

FIG. 14 is a sectional view of a typical gas bearing supporting a shaft, with capacitor plates arranged for the transmission of signals across the gas bearing; and FIG. 15 is a section view taken at 15—15 in FIG. 11.

DETAILED DESCRIPTION OF THE INVENTION

Referring to the figures, particularly FIG. 1, the instrument of this invention is shown with four substantially coplanar elements 10, 12, 14 and 16, each enclosed with a quadrant of a circle and mounted upon a shaft 18 by a uniformly compliant hub 20 and radially directed torsion springs 22, 24, 26 or 28 which are attached substantially in the plane of the hub 20 and whose radial directions of projection are 90° apart. The moments of inertia of the elements 10, 12, 14, and 16 are the spring constants of springs 22, 24, 26 and 28 in torsion are such that the undamped natural angular frequency of vibration of each of the elements about its respective torsion spring axis is substantially equal to the angular frequency of rotation of shaft 18. The shaft 18 is rotated by a motor 30. The term "torsion spring" includes any element having elastic torsion restraint such as torsion bars on flexure pivots. A preferred embodiment uses torsion bars of cruciform cross-section.

Preferably the elements 10, 12, 14 and 16 are within an evacuated housing to reduce damping substantially to zero.

In a preferred embodiment of the invention, the shaft 18 is supported, relative to an external housing, upon a gas bearing, and electrical signals are carried to and from the rotating shaft 18 and its associated elements by means of capacitive slip rings or commutators. Slip rings and commutators are shown schematically in FIG. 2, together with one of the sensing elements 10. The capacitor plate 32 is attached to and rotates with the shaft 18 (not shown), while the capacitor plate 34 is attached to the intsrument housing (not shown). The capacitor plates 36 and 38 are also attached to rotate with the shaft 18 (not shown) and the capacitor plates 40, 42, 44 and 46 are attached to the instrument housing (not shown). The capacitor plate 32 is electrically connected to a sensing capacitor plate 48 which is rigidly attached to rotate with shaft 18 (attachement not shown) and is positioned in proximity to one of the surfaces of the sensing element 10 to sense relative motion between that adjacent surface and the sensing plate 48. Forcing capacitor plates 50 and 52 are rigidly attached to rotate with shaft 18 (attachment not shown) and are positioned adjacent surfaces of element 10 to apply forces to element 10, creating controlled torques about the axis of spring 22. The capacitor plates 50 and 52 are electrically connected to capacitor plates 36 and 38, respectively.

The rotation of shaft 18 is shown by arrow 54.

Diametrically opposite non-rotating plates 40 and 44 are shown connected, with opposite polarity, to the same source of input signal. Similarly, electrodes 42 and 46 are shown connected, with opposite polarity, to the same source of input signal. The polarity reversals are typically created by inverting amplifiers 56 and 58. Alternatively a balanced amplifier (not shown) could be used to generate a pair of signals of equal amplitude and opposite sign. The external electrical connections to the device of FIG. 2 are described below at a more appropriate place.

The coordinate system is defined in FIG. 3. In FIG. 3, which is taken from the right in FIG. 1, each of the sensing elements 10, 12, 14 and 16 has one degree of angular freedom about its supporting torsion rod or spring. The angular coordinates of oscillation of the sensing members about their axis of oscillation are designated $\theta_1$, $\theta_2$, $\theta_3$, $\theta_4$, respectively. It should be noted that the axes of $\theta_1$ and $\theta_3$ are coaxial and that for convenience, $\theta_1$ and $\theta_3$ are measured in the same direction; and that $\theta_2$ and $\theta_4$ are coaxial and are measured in the same direction about the $x$ and $y$ axes.

A pair of axes, labeled X and Y, are perpendicular to the spin axis of the shaft 18, and stationary with respect to the housing (not shown) of the instrument.

In a preferred embodiment of the invention, the center of gravity 60 is displaced, in a first direction, parallel to the axis 59 of shaft 18, from the center of twist of the torsion rod 22 to make the sensing element 10 sensitive to acceleration components parallel to the $y$ axis. The center of gravity 64 of element 14 is displaced, in a second direction, parallel to the axis 59, from the center of twist of torsion rod 26 to make element 14 sensitive to acceleration parallel to the $y$ axis. The center of gravity 62 is displaced, in a first direction, parallel to the axis 59, from the center of twist of the torsion element 28 to make the sensing element 16 sensitive to acceleration in the direction of the $x$ axis, and the center of gravity 66 is displaced, in a second direction, parallel to the axis 59, from the center of twist of torsion rod 24 to make element 12 sensitive to acceleration parallel to the $x$ axis.

By making the elements pendulous, in the direction of the spin axis 59, with respect to the center of twist of each of the torsion rods or springs, the sensing elements are not only sensitive to angular rates about the X and Y axes, $\dot{\phi}_X$ and $\dot{\phi}_Y$, but also to accelerations in the X–Y plane, which generate moments $M_X$ and $M_Y$, about the X and Y axes. Elements 10 and 12 are said to be given a positive pendulosity while elements 14 and 16 are said to be given a negative pendulosity. Hence the sum, for example, of the sensed output signals of elements 10 and 14 are proportional to an angular rate while their difference is proportional to an acceleration. The same is true of elements 12 and 16.

In operation, the motor 30 drives shaft 18 at a predetermined angular frequency N. The approximating basic differential equation of motion of one of the inertial elements (for example, 10) of the invention may be found from Euler's equation for the motion of a rigid body. The ordinary torque equation, $L=\dot{J}$, wherein J (angular momentum) and L (torque) are both defined in a coordinate system whose axes are nonrotating in space, becomes when transformed into a system of axes fixed in the rotating body 10:

$$L_{x1} = I_{x1}\dot{\omega}_{x1} + (I_{z2} - I_{y1})\omega_{y1}\omega_z \quad (1)$$

for the component of torque around the rotating $x$ axis. I and $\omega$ are the moments of inertia and the angular velocities around $x$, $y_1$ $z_1$. $y_1$ and $z_1$ are axes substantially parallel to the $x$, $y$, and $z$ axes, passing through the center of mass 60 of member 10. If the above torque equation is then set equal to the torque, applied to the member 10, around the $x$ axis, due to the restraint of torsion spring 22 and the damping force, the basic equation for the system becomes:

$$I_{x1}\dot{\omega}_{x1} + (I_{z1} - I_{y1})\omega_{y1}\omega_{z1} + D\dot{\theta}_1 + K\theta_1 = 0 \quad (2)$$

wherein K is the angular spring constant of the torsion spring 22, and D is the angular damping constant of the member 10. $\theta_1$ is the angular excursion of the inertial element 10, measured about the $x$ axis, as shown in FIG. 3.

When the shaft 18, spinning at an angular frequency N, experiences an angular displacement $\phi_X$ around the X axis, then:

$$\omega_{x1} = \dot{\theta}_1 + \dot{\phi}_X \cos Nt \quad (3)$$

$$\omega_{y1} = N \sin \theta_1 - \dot{\phi}_X \sin Nt \cos \theta_1 \quad (4)$$

$$\omega_{z1} = N \cos \theta_1 + \dot{\phi}_X \sin Nt \sin \theta_1 \quad (5)$$

wherein $Nt$ represents the angle between the $x$ axis and the X axis. For very small excursions of $\theta_1$, Equations 3, 4, and 5 become:

$$\omega_{x1} = \dot{\theta}_1 + \dot{\phi}_X \cos Nt \quad (6)$$

$$\omega_{y1} = N\theta_1 - \dot{\phi}_X \sin Nt \quad (7)$$

$$\omega_{z1} = N \quad (8)$$

wherein sine $\theta_1$ is approximately equal to $\theta_1$, cosine $\theta_1$ is approximately equal to 1 and $\theta_1\dot{\phi}$ is very much smaller than N. Inserting Equations 6, 7 and 8 into Equation 2, the basic equation of motion becomes:

$$I_{x1}\ddot{\theta}_1 + D\dot{\theta}_1 + [K + N^2(I_{z1} - I_{y1})]\theta_1$$
$$= -I_{x1}\dot{\phi}_X \cos Nt + N(I_{x1} + I_{z1} - I_{y1})\dot{\phi}_X \sin Nt \quad (9)$$

which can be recognized as the equation of a damped forced harmonic oscillator. It is desirable that the system have its undamped natural angular frequency of oscillation at the driving angular frequency N. The torsion spring constant K, then, must be chosen so that:

$$I_{x1}N^2 = K + N^2(I_{z1} - I_{y1}) \quad (10)$$

solving for K, $$K = N^2(I_{x1} + I_{y1} - I_{z1}) \quad (11)$$

The basic Equation 9 then becomes:

$$I_{x1}\ddot{\theta}_1 + D\dot{\theta}_1 + I_{x1}N^2\theta_1 = (I_{x1} + I_{z1} - I_{y1})N\dot{\phi}_X \sin Nt$$
$$- I_{x1}\dot{\phi}_X \cos Nt \quad (12)$$

If it is assumed that the rate of change of the angular displacement of the case of the instrument is a constant (which inherently makes $\ddot{\phi}$ equal to zero), that the damping constant D is negligible, and that the time constant of the system, T, defined as $2I_{x1}/D$ is very, very large, the solution of Equation 12 can be approximated by $$\theta_1 = \frac{(I_{x1} + I_{z1} - I_{y1})}{DT}(\dot{\phi}_X t) \cos Nt \quad (13)$$

Equation 13 demonstrates that for small angles of $\theta_1$, the amplitude of the angular oscillation excursion of the inertial element 10 is directly proportional to the rotational displacement $\dot{\phi}_X t$ of the shaft 18 and the housing of the instrument (not shown) about the X axis. Although it is not expressly stated in Equation 13, the $\dot{\phi}$ term need not have a subscript, in which event the argument of the cosine term would have a phase angle which, with the aid of a timing signal, would yield the angle between the axis of the applied $\dot{\phi}$ and the X axis. Further, equations for $\theta_2, \theta_3$ and $\theta_4$ would be similar to Equation 13 with 90° phase shifts between the signals.

If the shaft 18 of the instrument is subjected to vibrations of a 2N frequency, the vibrations are rectified by the system and appear in the angular excursion $\theta_1$ of the inertial element 10 (as well as in $\theta_2, \theta_3,$ and $\theta_4$) as a spurious rotational displacement. That fact can be made more apparent by the following mathematical analysis in which the angular vibrations of 2N frequency can be represented by:

$$\phi = G \cos 2Nt + H \sin 2Nt \quad (14)$$

$$\dot{\phi} = -2NG \sin 2Nt + 2NH \cos 2Nt \quad (15)$$

$$\ddot{\phi} = -4N^2G \cos 2Nt - 4N^2H \sin 2Nt \quad (16)$$

Substitute Equations 14, 15 and 16 into Equation 12 using the following identities:

$$\sin 2Nt \sin Nt = \tfrac{1}{2}(\cos Nt - \cos 3Nt) \quad (17)$$

$$\cos 2Nt \sin Nt = \tfrac{1}{2}(\sin Nt - \sin 3Nt) \quad (18)$$

$$\cos 2Nt \cos Nt = \tfrac{1}{2}(\cos Nt + \cos 3Nt) \quad (19)$$

$$\sin 2Nt \cos Nt = \tfrac{1}{2}(\sin Nt + \sin 3Nt) \quad (20)$$

and neglecting 3N frequency terms because the system is very insensitive to those frequencies, the following equation of motion is obtained due to the vibrations:

$$I_{x1}\ddot{\theta}_1 + D\dot{\theta}_1 + I_{x1}N^2\theta_1 = N^2(I_{x1} + I_{y1} - I_{z1}) \quad (21)$$
$$(G \cos Nt + H \sin Nt) = K(G \cos Nt + H \sin Nt)$$

Using the assumption which were used to obtain Equation 13, the solution to Equation 21 can be approximated by:

$$K = \sqrt{\frac{G^2 + H^2}{NDT}} \, t \cos(Nt + \alpha) \quad (22)$$

It is apparent that Equation 22 is identical in form to Equation 13. Therefore, output signals are generated by the spurious 2N frequency forces which are indistinguishable from the output signals generated by a rotational displacement to be measured.

Each inertial element is adapted to generate two pieces of information, e.g. angular rate about the X or Y axes, accelerations in the direction of the X or Y axes, frequency responses due to angular rates applied to frequency 2N, and responses due to accelerations having a frequency 2N, to cancel the 2N frequency responses, then, requires four pieces of information, two for the responses due to angular rate and two for the responses to accelerations. The 2N frequency responses are then used to cancel each other, thereby leaving only responses due to applied angular rates and accelerations of relatively long duration. Consider the 2N frequency vibration cancellation which may be achieved by sensing the response of torsion springs 22 and 24. In the shown device, the two torsion springs 22 and 26 are substantially right angles with respect to torsion bars or springs 24 and 28.

For inertial element 12, Equation 1 becomes:

$$L_{y2} = I_{y2}\dot{\omega}_{y2} + (I_{z2} - I_{x2})\omega_{x2}\omega_{z2} \quad (23)$$

for the component of torque about the rotating $y$ axis. The $I$ and $\omega$ are the moments of inertia and the angular velocities around axes $x_2$, $y$, and $z_2$, substantially parallel to the $x$, $y$, and $z$ axes, passing through the center of mass 66 of member 12. If the above torque equation is then set equal to the torque applied to the member 12 about the $y$ axis due to the restraint of torsion spring 24 and the damping force, the basic equation for the system becomes:

$$I_{y2}\dot{\omega}_{y2} + (I_{x2} - I_{z2})\omega_{x2}\omega_{z2} + D\dot{\theta}_2 + K\theta_2 = 0 \quad (24)$$

wherein K is the angular spring constant of the torsion spring 24, and D is the angular damping constant of the member 12. $\theta_2$ is the angular excursion of the inertial element 12, measured by the $y$ axis, as shown in FIG. 3.

When the shaft 18, spinning at an angular frequency N, experiences an angular displacement $\phi_X$ around the X axis, then:

$$\omega_{y2} = \dot{\theta}_2 - \dot{\phi}_X \sin Nt \quad (25)$$

$$\omega_{x2} = -N \sin \theta_2 + \dot{\phi}_X \cos Nt \cos \theta_2 \quad (26)$$

$$\omega_{z2} = N \cos \theta_2 + \dot{\phi}_X \sin Nt \sin \theta_2 \quad (27)$$

wherein $Nt$ represents the angle between the $x$ axis and the X axis. For very small excursions of $\theta_2$, Equations 25, 26, and 27 become:

$$\omega_{y2} = \dot{\theta}_2 - \dot{\phi}_X \sin Nt \quad (28)$$

$$\omega_{x2} = -N\theta_2 + \dot{\phi}_X \cos Nt \quad (29)$$

$$\omega_{z2} = N \quad (30)$$

Inserting Equations 28, 29, and 30 into Equation 24, the basic equation of motion becomes:

$$I_{y2}\ddot{\theta}_2 + D\dot{\theta}_2 + [K + N^2(I_{z2} - I_{x2})]\theta_2$$
$$= N\dot{\phi}_X[I_{y2} + I_{z2} + I_{x2}] \cos Nt + \ddot{\phi}_X I_y \sin Nt \quad (31)$$

which is the equation of a damped forced harmonic oscillator. The undamped natural angular frequency of oscillation of the member 12 is set equal to the driving angular frequency N. To that end, the torsion spring constant K must be chosen so that:

$$I_{y2}N^2 = K + N^2(I_{z2} - I_{x2}) \quad (32)$$

solving Equation 32 for K, the Equation 11 is obtained:

$$K = N^2(I_{x2} + I_{y2} - I_{z2}) \quad (11)$$

the basic Equation 31 then becomes:

$$I_{y2}\ddot{\theta}_2 + D\dot{\theta}_2 + I_{y2}N^2\theta_2$$
$$= (I_{y2} + I_{z2} - I_{x2})N\dot{\phi}_X \cos Nt + I_{y2}\ddot{\phi}_X \sin Nt \quad (33)$$

If it is assumed that the rate of change of the angular displacement of the case of the instrument is a constant, that the damping constant D is negligible, and that the time constant of the system of element 12, T, defined as $2I_{y2}/D$ is very large, the solution of Equation 33 can be approximated by:

$$\theta_2 = \frac{(I_{y2} + I_z - I_{x2})}{DT}(\dot{\phi}_X t) \sin Nt \quad (34)$$

The similarity of Equation 34 to Equation 13 should be noted. To compare the two equations, it must be noted that the $I_{x1}$ of Equation 13 is numerically equal to the $I_{y2}$ of Equation 34, the $I_{z1}$ of Equation 13 is numerically equal to the $I_{z2}$ of Equation 34, and the $I_{y1}$ of Equation 13 is numerically equal to the $I_{x2}$ of Equation 34. Thus, Equations 13 and 34 are identical except for a phase shift.

If the shaft 18 of the instrument is subjected to vibration, using Equations 14, 15, 16, 17, 18, 19 and 20 in Equation 33, and neglecting the 3N frequency terms, the following equation of motion is obtained due to the vibrations:

$$I_{y2}\ddot{\theta}_2 + D\dot{\theta}_2 + I_{y2}N^2\theta_2 = N^2(I_{y2} + I_{x2} - I_{z2})$$
$$(G \sin Nt - H \cos Nt) = K(G \sin Nt - H \cos Nt) \quad (35)$$

Using the assumptions which were used to obtain Equation 34, the solution of Equation 35 can be approximated by:

$$\theta_2 = \frac{K\sqrt{G^2 + H^2}}{NDT} t \cos(Nt + \alpha) \quad (36)$$

It is to be noted that the responses, $\theta_1$ and $\theta_2$, due to 2N angular frequency driving rates are in phase, while the $\theta_1$ and $\theta_2$ responses due to an applied $\dot{\phi}_X$ are 90° apart. Thus, the outputs of $\theta_1$ and $\theta_2$ may be subtracted to eliminate the response due to the 2N frequency angular rates while still keeping the response due to $\dot{\phi}_X$.

To this point, the fact that the inertial elements have their center of mass displaced a preselected distance, in the direction parallel to the shaft 18, from the center of twist of the torsion springs has not appeared in our equations, nor has it been discussed in detail. Because the center of mass is displaced from the center of twist of the torsion springs, an acceleration in any direction, except that parallel to the direction of the axis of the shaft 18, applies a torque on each of the inertial elements. These torques, it can be shown, appear in the equations of motion of each inertial element of the instrument exactly like an angular rate $\dot{\phi}$. Because the moment of torque produced by an acceleration is orthogonal to the acceleration causing it, an angular displacement about and an acceleration along a particular axis appear 90° out of phase in the equations of motion.

Thus, the output signal from the sensor of an instrument, with its center of mass displaced, contains components not only of rotational displacement but also of acceleration. To separate out the component of acceleration, without the use of a separate accelerometer, the two sensors on opposite ends of the same diameter are made pendulous in opposite directions. Hence the sum, for example, of the amplitude of the outputs of elements 10 and 14 would be proportional to an applied angular rate while the difference between the amplitudes of the outputs of elements 10 and 14 would be proportional to an acceleration. Similarly, the sum of the amplitudes of the outputs of elements 12 and 16 would be proportional to an applied angular rate and the difference between the amplitudes would be proportional to an acceleratiton. The sensed angular rate and acceleration would then have their phase of oscillation compared to the frequency of a reference source to determine the axis about which the applied external angular rate occurs and to determine the direction of the applied acceleration.

It should be noted, however, that in accordance with the solutions of the vibrating element equations, set forth above, (wherein the time constant is very long) the angular rate information is really the angular rate times the time (or the angular displacement); and the accelerational information is really the acceleration times the time it has been applied (or the velocity). To obtain true acceleration and angular rate information, the output signals are fed back to apply torque to the vibrating elements to operate them in a closed loop configuration. Since the angular excursion of each inertial element is constantly being torqued back to null, the torque balancing voltages therefore contain true acceleration and angular rate information.

FIG. 4 is a schematic representation of the torquing circuit for each of the inertial vibratory elements of the instrument. FIG. 4 is a more detailed typical circuit than that shown in FIG. 2. In FIG. 4, the left side of the figure shows a capacitor torque-resolver (one is needed for each inertial element) with the four stationary plates 40, 42, 44 and 46 each covering an arc of slightly less than 90°, with the two rotating plates 36 and 38 spaced 180° apart and each covering an arc of 90°. The four stationary plates are shown connected to two torque amplifiers 56 and 58 so that voltage $e_x$, $e_y$, $-e_x$ and $-e_y$ are applied as shown. Voltage $e_x$ represents the torquer signal from the x-axis amplifier and $-e_x$ appears at the output of the amplifier 58. Amplifiers 56 and 58 are shown connected as if they only include an inverting amplifier. However, in a preferred embodiment, a balanced amplifier, of the kinds well known in the art, generating opposing voltages, may be used. The voltages $e_y$ and $-e_y$ are the corresponding signals for the y-axis. It will be shown below that the projections on the X-axis and the Y-axis of the effective torque on a typical inertial element is proportional to $e_x$ and $e_y$, respectively. Consequently, the voltages $e_x$ and $e_y$ are analogous to the torquer currents in conventional floated gyroscopes.

The left side of FIG. 4 shows one rotor segment across the air bearing supporting the shaft 18 (not shown in FIG. 4), and the relative position of the capacitor torquer-plates 50, 52 and the inertial element 10. The vibrating inertial elements and their supporting springs are electrically insulated from the rest of the rotating structure and are electrically connected, to the non-rotating part or housing (not shown), through a mercury button contact 70 located at one end of the shaft 18. Through mercury contact 70 the rotor is biased by a voltage source 72 whose voltage amplitude is designated $V_B$ and whose other terminal is connected to the ground or common terminal.

Two very high resistance resistors 74 and 76 are connected between the rotor segments 38 and 36, with their common terminal connected, through a mercury button contact 78, to the ground terminal. The two resistors 74 and 76 are used to bleed off any static charge that might accumulate in the circuit. Consequently, $e_a$ and $e_b$ are periodic voltages with a zero average value.

A typical mercury button contact is shown in FIG. 5 in which a cup 80 is formed in a portion 81 of the housing (not shown in FIG. 5). Mercury 82 is inserted into the cup 80. A conductive pin 84, which is attached to and coaxial with shaft 18, is inserted into the mercury 82 to carry electric current and voltage between the shaft and the housing.

Referring again to FIG. 4, the voltage $e_a$ is determined by the capacitive coupling of the torque-resolver plate 38 with the fixed plates 40, 42, 44 and 46. For the shaft angle shown in the FIG. 4, plate 38 couples to plates 40 and 42, while plate 36 couples to plates 44 and 46. For all shaft angles the voltage induced on plate 36 is opposite in polarity and substantially identical in amplitude to the voltage induced onto plate 38.

The torque resulting from the voltages applied to plates 50 and 52 may be calculated by considering FIG. 6. In FIG. 6 the inertial element 10 is adapted to oscillate about the axis of twist, or torsion axis, of torsion spring 22, as shown by arrow 86. In FIG. 6, $g$ is the gap between the torquer plates 50 and 52 in the absence of oscillation of member 10, and $a$ is the radius arm from the center of torsion or twist of torsion spring 22 to the centroid of the plates 50 and 52.

In the following equations, A is equal to the area of each of the plates 50 or 52 and $\epsilon$ is the permitivity of a vacuum.

The force, with element 10 centered, applied by the capacitor plate 50 is:

$$F = \frac{\epsilon A}{2}\left(\frac{V_B + e_a}{g}\right)^2 \quad (37)$$

The force applied by the capacitor plate 52 is:

$$F = \frac{\epsilon A}{2}\left(\frac{V_B - e_a}{g}\right)^2 \quad (38)$$

The net torque applied to member 10 is:

$$T = \frac{\epsilon A a}{2g^2}[(V_B + e_a)^2 - (V_B - e_a)^2] = \frac{2\epsilon A a}{g^2}e_a V_B \quad (39)$$

From Equation 39 it is apparent that the torque applied to member 10 is a linear function of the torquer voltage $e_a$.

To determine the voltage, $e_a$, reference should be had to the simplified diagram of FIG. 7. FIG. 7 shows the circuit for only one rotating plate, which is all that is required for analysis because $$e_b = -e_a \quad (40)$$

Using the sign convention shown in FIG. 7, and neglecting the time dependent functions for simplicity, it follows that:

$$q_1 = (-e_y - e_a)C_1 \quad (41)$$
$$q_2 = (e_x - e_a)C_2 \quad (42)$$
$$q_3 = (e_y - e_a)C_3 \quad (43)$$
$$q_4 = (-e_x - e_a)C_4 \quad (44)$$

wherein $C_1$ is the capacitance between plates 38 and 40, $C_2$ is the capacitance between plates 38 and 42, $C_3$ is the capacitance between plates 38 and 44, $C_4$ is the capacitance between plates 38 and 46, $q_1$ is the charge on plate 40, $q_2$ is the charge on plate 42, $q_3$ is the charge on plate 44 and $q_4$ is the charge on plate 46.

From FIG. 7, the charge on plate 38, $q_a$, is equal to:

$$q_a = q_1 + q_2 + q_3 + q_4 = (C_2 - C_4)e_x + (C_3 - C_1)e_y - (C_1 + C_2 + C_3 + C_4)e_a \quad (45)$$

Referring to FIG. 7, the bleed resistor 74 is shown in parallel without the leakage capacitance 90 to ground. The capacitor 92 represents the capacitance between plates 52 and member 10.

Because the rotating resolver plate 38 is a 90° arc, this plate always overlaps a total non-rotating plate area equal to the area of one non-rotating plate. Therefore, the maximum value of capacitance, $C_0$ between the rotating plate and any one stationary plate is not a function of time and is equal to:

$$C_0 = C_1 + C_2 + C_3 + C_4 \quad (46)$$

whence Equation 45 becomes:

$$q_a = (C_2 - C_4)e_x + (C_3 - C_1)e_y - C_0 e_a \quad (47)$$

The current through the resistor 74 is:

$$i_R = e_a/R \quad (48)$$

wherein R is the resistance of resistor 74. The charge on the leakage capacitance to ground is:

$$q_{90} = C_{90}e_a \quad (49)$$

wherein $C_{90}$ is the leakage capacitance 90 to ground. The current through the leakage capacitance 90 to ground is:

$$i_1 = \dot{q}_{90} = C_{90}\dot{e}_a \quad (50)$$

The charge on the torquer capacitor 92 is:

$$q_T = C_T(e_a - V_B) \quad (51)$$

wherein $C_T$ is the capacitance of capacitor 92.

The current through the torquer capacitance 92 is:

$$i_T = \dot{q}_T = C_T \dot{e}_a \quad (52)$$

The current in the lead from the rotating plate is:

$$i = \dot{q}_a = (\dot{C}_2 - \dot{C}_4)e_x + (\dot{C}_3 - \dot{C}_1)e_y - C_0 \dot{e}_a \quad (53)$$

setting Equation 53 equal to the sum of the currents of Equations 48, 50 and 52, $$\frac{e_a}{R} + (C_{90} + C_T + C_0)\dot{e}_a = (\dot{C}_2 - \dot{C}_4)e_x + (\dot{C}_3 - \dot{C}_1)e_y \quad (54)$$

To solve this equation, the functions:

$$(\dot{C}_2 - \dot{C}_4) \quad (55)$$

and $$(\dot{C}_3 - \dot{C}_1) \quad (56)$$

must be found. Recognizing that the individual capacitances, and thus their derivatives, are periodic and that the individual capacitances are triangular functions (except for the effect of the stationary plates being slightly less than 90° segments, which effect is neglected in this analysis) with peak values of $C_0$, the functions are plotted in FIG. 8.

The values of $(C_2-C_4)$ and $(C_3-C_1)$ each change by $2C_0$ over a range of $Nt = \pi$. Therefore:

$$|\dot{C}_2 - \dot{C}_4| = |\dot{C}_3 - \dot{C}_1| = 2C_0 N/\pi \quad (57)$$

The expression $(\dot{C}_2 - \dot{C}_4)$ can be expanded into a Fourier series containing only sine terms of odd harmonics, and $(\dot{C}_3 - \dot{C}_1)$ can be expanded into a Fourier series containing only cosine terms of odd harmonics. Since the inertial element is tuned to the spin frequency, it is responsive only to the torques having a frequency of the spin frequency; and since the torque is proportional to the control voltage, it will thus only be responsive to the torque at the fundamental frequency of each of the Fourier series. Since the amplitude of the fundamental term of the Fourier series of a square wave is $4/\pi$ times the amplitude of the square wave, Equation 54 becomes:

$$e_a/R + (C_{90} + C_T + C_0)\dot{e}_a = \frac{-8C_0 N}{\pi^2} e_x \sin Nt$$

$$- \frac{8C_0 N}{\pi^2} e_y \cos Nt \quad (58)$$

when Equation 58 is solved for $e_a$, $$e_x = \left[\frac{-8C_0 RN}{\pi^2 \sqrt{1 + R^2 N^2 (C_{90} + C_T + C_0)^2}}\right]$$

$$[e_x \sin(Nt - \psi) + e_y \cos(Nt - \psi)] \quad (59)$$

wherein:

$$\psi = \tan^{-1}(C_{90} + C_T + C_0)RN \quad (60)$$

Because the only purpose of the two resistors, 74 and 76, is to bleed off the static charge buildup, it is expected that very large values of resistances will be adequate. With a very large value of resistance, only a small phase shift will be realized from that which would occur with an infinite resistance. Smaller values of resistance result in increased phase shift, but the effect is only to rotate the input axes of the instrument, which can be corrected during the axis alignment of the instrument.

If the resistance of resistors 74 and 76 is extremely large, the voltage $e_a$, and thus the torque waveform, is triangular with the same phasing as $(C_2-C_4)$ for $e_x$ inputs and $(C_3-C_1)$ for $e_y$ inputs, shown in FIG. 8. Under the assumption that the resistance of resistors 74 and 76 are very very large, Equation 59 becomes:

$$e_a = \left[\frac{-8C_0}{\pi^2(C_{90} + C_T + C_0)}\right][e_y \sin Nt - e_x \cos Nt] \quad (61)$$

substitution Equation 61 into Equation 39:

$$T = \left[\frac{-16\epsilon A a C_0 V_B}{\pi^2 g^2 (C_{90} + C_T + C_0)}\right][e_y \sin Nt - e_x \cos Nt] \quad (62)$$

Thus, the torque or moment (and hence the acceleration) sensed by the vibrating inertial element may be represented as a voltage, $e_y$, which is proportional to the acceleration in the Y direction, and a voltage, $e_x$, which is proportional to the acceleration in the X direction.

The application of an electric field across the gap between the inertial element and the capacitive torquer plates results in an effective negative electrostatic spring rate. It may be shown that the negative spring rate is approximately equal to:

$$K = \frac{-2\epsilon A a^2}{g^3}[V_B^2 + e_a^2] \quad (63)$$

To compensate for the negative electrostatic spring rate, the mechanical spring constant of the supporting torsion spring is increased to maintain that effective net spring constant substantially equal to that required for the appropriate natural frequency. By making $V_B$ substantially greater than $e_a$, variations in the negative electrostatic spring rate are minimized. Further, the presence of a negative spring rate in the electrostatic field allows the torsion spring to be larger and stronger than it would be in the absence of an electrostatic spring rate.

The pickoff circuit for each inertial sensor is shown in FIG. 9. The left side of this figure shows the circuit for pickoff excitation and signal conditioning, the center is the pickoff commutator, and the right is a schematic of a vibrating sensor. Two plates 48 and 49, much like the torquer plates, are used for the pickoff. Plate 49 is connected to the sensor 10 so that it is at the same voltage as the sensor, and no forces exist between the two. Plate 48 is connected to the rotating electrode 32 of the pickoff commutator. Electrode 38 is electrically biased to the potential of the sensor 10 through the leakage resistor 100. At the pickoff carrier frequency, resistor 100 is essentially an open circuit compared to the impedance of the capacitive elements. Thus, these are no forces exerted on the element 10 except those due to the carrier voltage. The stationary electrode 34 of the pickoff commutator is connected to a capacitor 102, and is biased to the voltage of the sensor 10 through a resistor 104 whose resistance is very large. Consequently the bias voltage of voltage source 72 appears across condenser 102. Condenser 102 is a high voltage capacitor whose capacitance is substantially larger than the capacitance across the commutator between plates 32 and 34.

It should be noted that the capacitance of the capacitive slip ring, between electrodes 32 and 34, is directly in series with the pickoff capacitance between plates 48, 49 and element 10, whereby variations in the capacitance between plates 32 and 34 cannot be distinguished from changes in the pickoff capacitance caused by motion of the inertial element 10. However, the slip ring preferably has a high dielectric coating (such as ceramic) which reduces the change in capacitance between elements 32 and 34, due to gas bearing eccentricity, to a negligible value. It also is a much larger capacitance than the pickoff capacitance and therefore the total circuit capacitance depends primarily on the variation of the pickoff capacitance; the smaller capacitance in the series connection.

A square wave or sine wave oscillator 106 is connected between the ground terminal and the anode of diode 108 whose cathode is connected to capacitor 102. A capacitor 110 is connected to the anode of diode 112 whose cathode is connected to the anode 108 and to voltage source 106. The junction of capacitor 110 and diode 112 is connected through resistors 114 and 116 to the junction between capacitor 102 and diode 108. Resistor 118 is connected between the ground terminal and the junction between resistors 114 and 116.

In operation of the twin T circuit of FIG. 9, the excitation is provided by the square wave oscillator 106. During the positive half-cycle of voltage of oscillator 106, capacitor 102, the capacitance between electrodes 32 and 34, and the pickoff capacitor plate 48 is charged through diode 108. When the oscillator voltage goes negative capacitor 110 becomes negatively charged through diode 112, while the pickoff capacitor starts to discharge through the slip ring capacitance, capacitor 102, and resistors 116, 118. Diode 108 is back biased. When the oscillator voltage again goes positive, the pickoff capacitor is again charged through diode 108 and capacitor 110 starts to discharge through resistors 114 and 118. With the circuit balanced, the parameters of the circuit are chosen so that the voltage across resistor 118 has equal amplitude positive and negative half-cycles. When the circuit is unbalanced in one direction or the other, by the displacement of element 10, one half-cycle of the voltage across resistor 118 becomes larger while the other half-cycle becomes smaller.

Under acceleration, represented by the arrows 122 in FIG. 10, parallel to the axis 59, each cantilevered inertial element—for example, element 10 whose center of gravity is at 60—is deflected as shown in the lower part of FIG. 10. The element 10, however, is not turned about an axis perpendicular to the plane of FIG. 10 because the torsion spring 22 deflects in a higher mode of bending, i.e. a bending mode comprising at least one point of inflection, wherein the point of inflection of the spring in the presence of centrifugal force represented an arrow 124, is at the center of mass 60 of the inertial element 10. Hence no angular momentum is developed by the inertial element 10 about an axis perpendicular to the plane of FIG. 10 by acceleration in the direction of arrows 122 because such acceleration only translates and does not rotate element 10.

A practical structure, of which may be fabricated in accordance with this invention, is shown in FIGS. 11 through 15. In those figures, the inertial sensing element assembly 208 is enclosed in an evacuated chamber formed by an end cap 260 which is attached to and rotates with shaft 18. The end bell or cover 260 is attached to shaft 18 by a fixture 258, which completes the evacuated enclosure and is shown in FIG. 11. The tip-off where the evacuation of the region of assembly 208 occurs is shown at 280. The vacuum in the region of the assembly 208 need not be a hard vacuum, but only that requred to reduce the damping to an insignificant value.

The assembly 208 is shown more particularly in FIGS. 12 and 13. The four inertial sensing elements 10, 12, 14 and 16 are supported by radially directed cruciform torsion springs 22, 24, 26 and 28. The springs are attached to a collar 20 which is electrically insulated from shaft 18 by at least one electrically insulative collar 262. The collar 20, which is at the same electrical potential as the inertial sensing element, is connected through a bonding fixture or electrical connector 264 to the central pin of a feed-through insulator 266. The central pin 265 is connected through a mercury cup 70 to a feed-through insulator 268 which is adapted to receive voltage from the biasing source 72.

The capacitor plates 50 and 52 are supported upon shelves 300 and 302, and are spaced apart by a spacer 388 which also electrically insulates the two electrodes 50 and 52 from each other.

Each of the inertial sensing elements 10, 12, 14 and 16 is shown with four balancing screws—for example 310, 312, 314 and 316. The screws are to adjust the position of the center of gravity and the moment of inertia of the inertial sensing element.

The shaft 18 has, on portions of its outer periphery a stack of ceramic wafers, some of which are spacers and others of which support capacitive electrodes, which are used to carry torquing voltage and pickoff voltage across the gas bearing 222. Details of the bearing and of the capacitor plates for carrying voltage across the bearing are shown more particularly in FIGS. 14 and 15. In FIG. 14 is shown a segment of the air bearing 222 with the stator portion at 290 and the rotor portion at 292. A plurality of spacer rings 229, 230 and 231 on the rotor portion 292; and 232, 233, 234 on the stator portion 290 separate the rotating ceramic rings, 235, 236, 237 which carry conductive plates 238, 239, 240 and the stationary ceramic rings 241, 242, 243 which carry conductive segments 294, 296, 298. The conductive segments of the device of FIG. 14 correspond to the plates 32, 34, 36, 38, 40, 42, 44, and 46 of FIGS. 4, 7 and 9.

The outer connectors, as shown at 318 in FIG. 11 and 319 in FIG. 15 are connected to external connections by means of wire such as wire 252 and a feed-through insulator such as insulator 254. The internal capacitor plates, such as the one shown at 320, are connected to wires which extend axially along the shaft 18, as shown at 322 in FIG. 15, to connect to the appropriate capacitor plates adjacent the inertial sensing elements.

The stator rings 290 are supported by sleeve members 322 and 324 which are bolted to a frame or support 202.

A gas thrust bearing 220 is formed between stationary members 216, 218 and member 214 which is attached to shaft 18.

The shaft 18 is grounded through mercury cup 78 to the frame member 204. The frame member 204 completes the enclosure around the instrument, supports the stator windings 212 of motor 30, and supports the stationary magnetic heads 207 and 209.

A hysteresis ring 210 is positioned adjacent winding 212 to complete the motor 30. The ring 210 is connected to a hub 324 which attaches it to the shaft 18. The hub 324 also supports a pair of magnetic tracks 211, 213 which are adapted to interact with the magnetic heads 207 and 209 to generate reference signals indicating the angular position of the shaft 18.

The enclosure 200 completes the housing of the device of this invention. A tip-off member 201 is positioned in the wall of housing 200 to allow the housing to be evacuated and refilled to a partial atmosphere—for example— of hydrogen or helium (other gases may be used).

The outer shells 400 and 401 are attached to complete the electrical shielding of the instrument.

There has thus been described a novel instrument which is adapted to measure angular rates and lineal accelerations, and to modify those signals to generate angular displacement and lineal velocity information. The described device is extremely compact and simple, and is relatively inexpensive compared to conventional gyroscopes and accelerometers.

It is to be stressed that the device may be operated as a multisensor in the sense that it senses both angular rates and lineal acceleration, or it may be used to sense angular rates without sensing lineal acceleration or to sense lineal acceleration without sensing angular rates.

In the preferred embodiment, four inertial sensors are used to generate eight pieces of information, i.e. information of the angular displacement of the instrument about two axes (two pieces of information), information of the lineal velocity components along two axes (two pieces of information), response of the instrument due to 2N frequency angular rates (two pieces of information obtained from different sources, whereby the effect of the 2N frequency rates may be canceled), and response of the instrument due to 2N frequency lineal accelerations (two pieces of information obtained from different sources, whereby the effect of the 2N frequency accelerations may be canceled).

Although the device has been described in detail above, it is not intended that the invention should be limited by that description, but only in accordance with the spirit and scope of the appended claims.

What is claimed is:

1. A multisensor comprising:
support means;
a plurality of inertial elements;
shaft means for rotating said plurality of inertial elements, said shaft means supported by said support means;
means for rotating said shaft means at a selected angular frequency;

a plurality of suspension means for torsionally coupling said inertial elements to said shaft means, with said suspension means being angularly disposed to each other and to said shaft, and at least one of said inertial elements having its center of mass displaced a preselected distance from its center of suspension, and said suspension means each including a separate torsion spring for supporting the corresponding element for freedom of vibration about the torsional axis of its associated torsion said torsional axis being angularly disposed about the axis of said shaft; and means for generating signals representative of the vibration of said inertial elements about their respective torsional axis.

2. In combination:

a first housing enclosing a controlled gas atmosphere;

a shaft within said housing, said shaft rotatable with respect to said housing about a first axis;

means for rotating said shaft at a selected angular frequency;

a dynamic gas bearing, positioned between said housing and said shaft;

a substantially evacuated rotatable housing attached to rotate with said shaft;

a hub within said rotatable housing, attached to said shaft;

four torsion springs connected to said hub, said torsion springs having their axes of torsion, in the absence of load, directed along axes perpendicular to the axis of rotation on said shaft;

four vibratory inertial elements, cantilevered to the ends of said torsion springs for vibration about the torsion axes of said torsion springs;

means attached to said rotational housing for rotation therewith, said last mentioned means being positioned adjacent said inertial elements and being responsive to the vibration of said inertial elements about their respective torsion axes to generate signals which are measures of the vibration; and means for transmitting said signals across said gas bearing.

3. In combination:

a rotatable shaft, the axis of rotation of said shaft defining a first coordinate of a cylindrical coordinate system;

at least two substantially identical vibration members attached to said shaft by separate torsion springs for limited angular vibrations about a pair of axes at right angles to each other and to the axis of rotation of said shaft, the natural angular frequency of angular vibration of each of said vibration members on its respective supporting torsion spring being substantially equal to each other;

means for rotating said shaft at an angular frequency which is substantially equal to the undamped natural angular frequency of said vibratory members; and means for sensing the vibration of said vibratory members.

4. A device as recited in claim 3 in which said vibration members and torsion springs are four in number.

5. A device as recited in claim 4 wherein the axes of angular vibration are substantially coplanar and the centers of mass of said vibratory members are each displaced by a predetermined distance, in the direction of the axis of rotation of said shaft, from a plane containing the axes of vibration of said vibratory members.

6. An inertial instrument comprising:

a frame;

a hub;

a plurality of inertial elements, rotatable with respect to said frame about a first axis;

means for rotating said plurality of inertial elements at a selected angular frequency;

a plurality of torsion springs, said plurality of inertial elements each being cantilevered on the outward end of a separate torsion spring, each of said springs attached at one end to a said hub for rotation about said first axis, whereby said inertial elements are capable of vibratory motion about the torsional axis of its associated torsion spring, said torsional axes being angularly disposed in a plane perpendicular to said first axis, and at least one of said inertial elements has its center of mass displaced a preselected distance from its axis of vibration.

7. An inertial element comprising:

a rotatable shaft;

means for rotating said shaft at a selected angular frequency;

a plurality of inertial elements;

a plurality of torsional members for coupling said plurality of inertial elements to said shaft, with a separate torsional member associated with each inertial element; each said torsional member being angularly disposed with respect to said shaft and each other, and each said torsional member having a longitudinal axis defining a torsional axis about which the associated inertial element vibrates in response to changes in motion conditions of the instrument, the torsional axis of each said member being angularly disposed about the axis of said shaft; and means for sensing the vibration of each said inertial element and for producing first signals indicative thereof; whereby selected combinations of said first signals provide output signals representative of changes in motion conditions of the instrument, said output signals containing a substantial reduction in disturbance signals at a frequency substantially equal to a multiple of said selected angular frequency.

8. The instrument of claim 7 wherein said plurality of inertial elements are mounted symmetrically about the shaft, with the torsional axes substantially lying within one plane which perpendicularly intersects the shaft.

9. An inertial instrument according to claim 8 wherein each inertial element has the shape of a sector of a circle with a radial slot extending from the center of the circle into the sector towards a location near the periphery, and the torsional member extends through the slot to interconnect the shaft near the periphery of the sector.

10. An inertial instrument according to claim 8 wherein four inertial elements are disposed on separate torsional members, with said torsional members forming right angles between one another.

11. An inertial instrument according to claim 10 wherein the distance of the center of mass of each inertial element from the shaft is substantially equal to the distance of the location of the inflection point of the corresponding torsional member from the shaft.

12. An inertial instrument according to claim 11 wherein the center of mass of some of said inertial elements is displaced from the corresponding torsional axis in a direction parallel to the shaft.

13. An inertial instrument according to claim 12 wherein a pair of inertial elements are located at diametrically opposite positions on said shaft, and the centers of mass of these last mentioned inertial elements are displaced from the axes of vibration of the elements in opposite directions along an axis parallel to the shaft.

14. The instrument of claim 7 wherein selected ones of said inertial elements have their center of mass located along the corresponding torsional axis and other of said inertial elements have their center of mass displaced from the corresponding torsional axis in a direction parallel to said shaft; whereby other selected combinations of said first signals provide output signals representative of linear acceleration and other selected first signals are representative of angular change of motion conditions of an object supporting said instrument.

15. An inertial instrument according to claim 7 and further comprising:

a gas bearing supporting said shaft and wherein said means for sensing the vibration of each said inertial element and for producing first signals indicative thereof comprises a first capacitive coupling means, a second capacitive coupling means and a torquing arrangement for each one of said plurality of inertial elements, said first capacitive coupling means including a first pair of capacitor plates mounted on said shaft to rotate therewith and positioned adjacent to the surfaces of said plurality of inertial elements to sense the vibration of a corresponding one of said plurality of inertial elements and to produce the first signals indicative thereof, said second capacitive coupling means comprising a second pair of capacitor plates, a first one of said second pair of capacitor plates being a cylindrical capacitive element mounted on said shaft to rotate therewith and connected to one of said first pair of capacitor plates to receive the first signals, a second one of said second pair of capacitor plates being a stationary cylindrical capacitive element coaxially arranged and associated with said first capacitor plate of said second pair to provide an electrical coupling of the first signals across said gas bearing, said torquing arrangement comprising a capacitor torque-resolver and a third capacitive torquing means, said capacitive torque-resolver comprising a plurality of stationary capacitor plates each comprising a cylindrical segment and a third pair of capacitor plates each comprising a cylindrical segment, said plurality of stationary capacitor plates connected to receive selected output signals, said third pair of capacitor plates of said capacitor torque-resolver being mounted in juxtaposition on said shaft to rotate therewith and coaxially arranged and associated with said plurality of stationary capacitor plates of said capacitor torque-resolver to provide an electrical coupling of the output signals across said gas bearing, said capacitive torquing means including a fourth pair of capacitor plates mounted on said shaft to rotate therewith and positioned adjacent to the surfaces of said plurality of inertial elements, each of said fourth pair of capacitor plates connected to one of said third pair of capacitor plates of said capacitive torque-resolver to receive selected output signals to torque the vibration of each said inertial elements to null.

16. An inertial instrument comprising:

a rotatable shaft;

means for rotating said shaft at a selected angular frequency;

a plurality of inertial elements;

a plurality of torsional members for coupling said plurality of inertial elements to said shaft, with a separate torsional member associated with each inertial element; each said torsional member being angularly disposed with respect to said shaft and with each other, and each said torsional member having a longitudinal axis defining a torsional axis about which the associated inertial element vibrates in response to changes in motion conditions of the instrument, the torsional axis of each said member being angularly disposed about the axis of said shaft; with selected ones of said inertial elements having their their center of mass on the corresponding torsional axis and others of said inertial elements having their center of mass displaced from the corresponding torsional axis in a direction parallel to said shaft;

means for sensing the vibration of each said inertial element and producing first signals indicative thereof; whereby selected combinations of said first signals provide output signals representative of linear acceleration and selected first signals are representative of angular change of motion conditions of an object supporting the instrument; and torquer means connected to said means for sensing the vibration of each said inertial element to receive selected combinations of said first signals, said torquer means connected to said plurality of inertial elements to torque each of said plurality of inertial elements to null.

17. The instrument of claim 16 wherein said plurality of inertial elements are mounted symmetrically about the shaft, with the torsional axes substantially lying within one plane which perpendicularly intersects the shaft.

18. An inertial instrument according to claim 17 wherein four inertial elements are disposed on separate torsion members, with said torsion members forming right angles between one another.

19. An inertial instrument according to claim 18 wherein a pair of inertial elements are located at diametrically opposite positions on said shaft and the centers of mass these last mentioned inertial elements are displaced from the axis of vibration of the element in opposite directions along an axis parallel to the shaft.

References Cited

UNITED STATES PATENTS

| | | | |
|---|---|---|---|
| 3,142,991 | 8/1964 | Pittman | 73—504 |
| 3,206,986 | 9/1965 | Christensen | 73—505 |
| 3,302,465 | 2/1967 | Mathey | 73—505 |

FOREIGN PATENTS

| | | | |
|---|---|---|---|
| 1,328,401 | 4/1963 | France | 73—505 |

JAMES J. GILL, Primary Examiner

H. GOLDSTEIN, Assistant Examiner

U.S. Cl. X.R.

73—517; 74—5, 5.6